(12) United States Patent
Sugaya (10) Patent No.: US 11,061,995 B2
(45) Date of Patent: Jul. 13, 2021

(54) COMPUTER SYSTEM, LICENSE MANAGEMENT METHOD AND PROGRAM

(71) Applicant: OPTiM Corporation, Saga (JP)

(72) Inventor: Shunji Sugaya, Tokyo (JP)

(73) Assignee: OPTIM CORPORATION, Saga (JP)

( * ) Notice: Subject to any disclaimer, the term of this patent is extended or adjusted under 35 U.S.C. 154(b) by 29 days.

(21) Appl. No.: 16/479,647

(22) PCT Filed: Mar. 30, 2017

(86) PCT No.: PCT/JP2017/013258
§ 371 (c)(1),
(2) Date: Jul. 22, 2019

(87) PCT Pub. No.: WO2018/179225
PCT Pub. Date: Oct. 4, 2018

(65) Prior Publication Data
US 2020/0380093 A1    Dec. 3, 2020

(51) Int. Cl.
*G06F 21/10*    (2013.01)
(52) U.S. Cl.
CPC .... *G06F 21/105* (2013.01); *G06F 2221/0768* (2013.01); *G06F 2221/2137* (2013.01)
(58) Field of Classification Search
CPC ........... G06F 21/105; G06F 2221/0768; G06F 21/2135; G06F 21/12; G06F 21/123;
(Continued)

(56) References Cited

U.S. PATENT DOCUMENTS 7,231,370 B1 *  6/2007  Kapur ................... G06Q 10/10
                                                                 705/59
7,483,860 B2 *  1/2009  Cronce ................. G06Q 30/06
                                                                 705/50
(Continued)

FOREIGN PATENT DOCUMENTS

JP    2003-323515    11/2003
JP    2010-86461     4/2010
JP    2013-125417    6/2013

OTHER PUBLICATIONS

Trend Micro, Merit of license purchase, Benefits of purchasing a license, Jul. 22, 2019, https://b-online.trendmicro.co.jp/qq2/tmds/licenseMerit.asp.

*Primary Examiner* — David Garcia Cervetti
(74) *Attorney, Agent, or Firm* — Lex IP Meister, PLLC (57) ABSTRACT

It is an object to provide a computer system, a license management method, and a program capable of effectively using owned licenses and improving the convenience. A computer system that manages licenses of an application acquires a number of owned licenses, calculates a number of unused licenses which are not currently used, determines a number of rentable licenses from the calculated number of unused licenses, and provides the determined rentable licenses. Further, the computer system stores the number of rentable licenses and a rental period of the rentable licenses in association with each other, and provides the rentable licenses during the rental period. Furthermore, the computer system provides a minimum number of licenses among numbers of rentable licenses in the rental period.

8 Claims, 8 Drawing Sheets

(58) Field of Classification Search
CPC ............ G06F 2221/2137; G06F 21/10; G06F 21/121; G06F 21/604; G06Q 2220/18; G06Q 20/1235; H04N 21/4627; H04N 21/2541; H04N 21/8355; H04L 67/34; H04L 2209/603; H04L 2463/101; H04L 63/10; H04L 63/062

See application file for complete search history.

(56) References Cited

U.S. PATENT DOCUMENTS

| | | | | |
|---|---|---|---|---|
| 7,716,348 | B1* | 5/2010 | Redding | G06F 21/105 709/229 |
| 7,962,424 | B1* | 6/2011 | Colosso | G06Q 30/06 705/50 |
| 8,694,434 | B1* | 4/2014 | Kley | G06Q 20/1235 705/59 |
| 2002/0002466 | A1* | 1/2002 | Kambayashi | G11B 20/00557 726/27 |
| 2005/0125509 | A1* | 6/2005 | Ramachandran | G06F 8/61 709/220 |
| 2006/0059103 | A1* | 3/2006 | Ebihara | G06F 21/10 705/59 |
| 2006/0059104 | A1* | 3/2006 | Ebihara | G06F 21/10 705/59 |
| 2006/0059105 | A1* | 3/2006 | Ebihara | G06F 21/10 705/59 |
| 2006/0085350 | A1* | 4/2006 | Samayamantry | G06Q 30/02 705/59 |
| 2008/0244754 | A1 | 10/2008 | Curren | |
| 2009/0055320 | A1* | 2/2009 | Goertler | G06Q 10/10 705/59 |
| 2009/0055835 | A1* | 2/2009 | Zhu | H04W 28/08 718/105 |
| 2010/0057674 | A1* | 3/2010 | O'Donnell | G06Q 30/00 707/E17.044 |
| 2010/0088413 | A1 | 4/2010 | Nishimoto | |
| 2011/0202433 | A1* | 8/2011 | Yokoyama | G06F 21/105 705/28 |
| 2012/0173353 | A1* | 7/2012 | Rausch | G06Q 30/0601 705/26.1 |
| 2013/0262265 | A1* | 10/2013 | Song | G06F 21/105 705/26.41 |
| 2016/0224905 | A1* | 8/2016 | Paladino | G06Q 10/00 |
| 2017/0024548 | A1* | 1/2017 | Dorwin | G06F 16/9535 |
| 2017/0220778 | A1* | 8/2017 | Fuse | G06F 8/71 |
| 2017/0243229 | A1* | 8/2017 | Dokai | G06Q 30/018 |
| 2018/0144108 | A1* | 5/2018 | Sawai | G06Q 10/10 |
| 2018/0253809 | A1* | 9/2018 | Meyer | H04L 67/141 |

* cited by examiner

License data table

|  | Total license number | Used license number | Unused license number | Rentable license number |
|---|---|---|---|---|
| A company | 300 | 270 | 30 | 29 |
| B company | 200 | 180 | 20 | 15 |
| ⋮ | ⋮ | ⋮ | ⋮ | ⋮ |

FIG. 7

Rental data table

|  | 1 | 2 | 3 | 4 | ... |
|---|---|---|---|---|---|
| A company | 29 | 27 | 25 | 5 | ... |
| B company | 15 | 15 | 15 | 0 | ... |
| ⋮ | ⋮ | ⋮ | ⋮ | ⋮ | ⋮ |

FIG. 8

Rentable license number table

|  | 1 | 2 | 3 | 4 | ... |
|---|---|---|---|---|---|
| License number | 44 | 42 | 40 | 5 | ... |

COMPUTER SYSTEM, LICENSE MANAGEMENT METHOD AND PROGRAM

TECHNICAL FIELD

The present invention relates to a computer system, a license management method, and a program for managing licenses of an application.

BACKGROUND ART

Conventionally, installing an application on a computer device has been performed by making the application available by using a recording medium (CD, DVD, or the like) included in a package, or by acquiring the application itself from the WEB or the like and registering only the license. In particular, when the common application (anti-virus application, spreadsheet application, document creation application, or the like) is used in a company or the like, it is effective to make the common application available by registering only the license. For example, it is known that the head office purchase licenses collectively and distribute them to each sales office (see Non-Patent Document 1).

In addition, as a configuration using the package, by distributing the recording medium recording a trial version and a product version whose use is restricted to the user, the user can release the restriction when a predetermined condition (user registration, charging, or the like) is satisfied (see Patent Document 1).

PRIOR ART DOCUMENT

Non-Patent Document

Non-Patent Document 1: https://b-online.trendmicro.co.jp/qq2/tmds/licenseMerit.asp

Patent Document

Patent Document 1: Japanese Patent Application Publication No. 2003-323515

SUMMARY OF THE INVENTION

Technical Problem

However, in the configuration of Non-Patent Document 1, when the applicant is made available by registering only the license, at the time of purchase, the license is often purchased in anticipation of a future increase. As a result, a certain amount of license has been left unused and has not been used effectively.

Further, in the configuration of Patent Document 1, when used by a large number of users, it is necessary to frequently manage used recording media and unused recording media, and thus the convenience is low.

An object of the present invention is to provide a computer system, a license management method, and a program capable of effectively using owned licenses by renting an unused license to another person, thereby improving the convenience.

Technical Solution

The present invention provides the following solutions.
The present invention provides a computer system that manages licenses of an application, the computer system including an acquiring unit that acquires a number of owned licenses, a calculating unit that calculates a number of unused licenses which are not currently used among the acquired number of licenses, a determining unit that determines a number of rentable licenses from the calculated number of unused licenses, and a providing unit that provides the determined rentable licenses.

According to the present invention, a computer system, which manages licenses of an application, acquires a number of owned licenses, calculates a number of unused licenses which are not currently used among the acquired number of licenses, determines a number of rentable licenses from the calculated number of unused licenses, and provides the determined rentable licenses.

The present invention is a category of a computer system, but even in categories such as a license management method and a program, exhibits the same action and effect.

Effects of the Invention

According to the present invention, it is possible to provide a computer system, a license management method, and a program capable of effectively using licenses owned by a user and improving the convenience.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

Overview of License Management System 1

Figure 1:
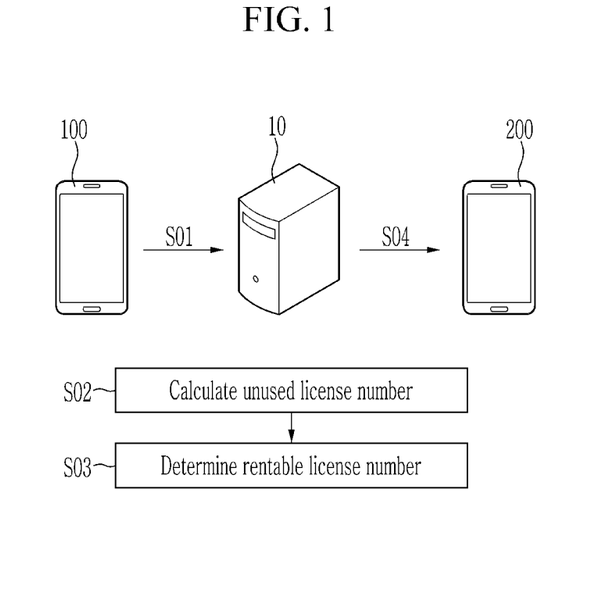
FIG. 1 is a diagram showing an overview of a license management system 1.

An overview of a preferred embodiment of the present invention is described with reference to FIG. 1. FIG. 1 is a diagram for explaining an overview of a license management system 1 according to a preferred embodiment of the present invention. The license management system 1 is a computer system that includes a computer 10, a provider terminal 100, and a user terminal 200, and that manages a license of an application (an anti-virus application, a spreadsheet application, a document creation application, or the like).

In addition, in FIG. 1, the number of computer(s) 10, the number of provider terminal(s) 100, and the number of user terminal(s) 200 can be changed suitably. The computer 10, the provider terminal 100, and the user terminal 200 are not limited to existing devices, but may be virtual devices.

Further, each process to be described below may be realized by any one of the computer 10, the provider terminal 100, and the user terminal 200, or a combination of two or more of them.

The computer 10 is a computer device connected to the provider terminal 100 and the user terminal 200 so as to be capable of performing data communication.

The provider terminal 100 is a terminal device connected to the computer 10 so as to be capable of performing data communication. The provider terminal 100 is a terminal device owned by a manager who manages an application or the like in a company or the like, and is a terminal device owned by a providing source who provides a license. The provider terminal 100 may be, for example, an electric appliance such as a mobile phone, a portable information terminal, a tablet terminal, a personal computer, a netbook terminal, a slate terminal, an electronic book terminal, or a portable music player, a wearable terminal such as a smart glasses or a head mount display, or other goods.

The user terminal 200 is a terminal device connected to the computer 10 so as to be capable of performing data communication. The user terminal 200 is a terminal device owned by a manager who manages an application or the like in a company or the like, and is a terminal device owned by a user who rents a license. The user terminal 200 is the electric appliance, the wearable terminal, or other goods, like the provider terminal 100 described above.

The computer 10 acquires the number of licenses owned by the provider terminal 100 (step S01). The computer 10 acquires the total number of licenses (the number of used licenses and the number of unused licenses) owned by the provider terminal 100.

The computer 10 calculates the number of unused licenses, which are not currently used, among the acquired number of licenses (step S02). The computer 10 calculates the acquired number of unused licenses.

The computer 10 determines the number of rentable licenses from the calculated number of unused licenses (step S03). For example, the computer 10 acquires information on the number of rentable licenses set in advance by the provider terminal 100, and determines the number of licenses that can be actually rented based on the acquired number of rentable licenses. Further, the computer 10 determines the number of rentable licenses from the number of unused licenses based on a preset ratio.

The computer 10 provides the user terminal 200 with a rentable license based on a request from the user terminal 200 (step S04). For example, the computer 10 stores the numbers of rentable licenses and rental periods in association with each other, and provides the user terminal 200 with the rentable license corresponding to a rental period specified by the user terminal 200. At this time, the computer 10 provides a license to the user terminal 200 based on the smallest number of licenses among the numbers of rentable licenses corresponding to the rental period.

The above is the overview of the license management system.

System Configuration of License Management System 1

Figure 2:
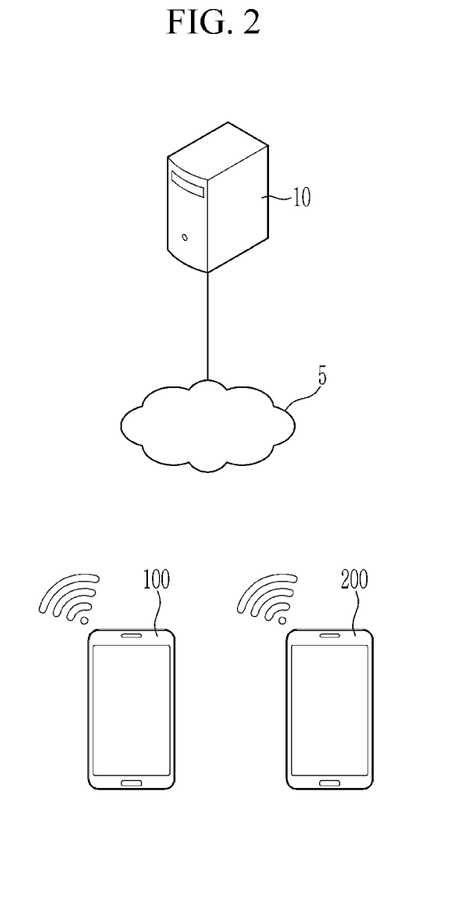
FIG. 2 is an overall configuration diagram of a license management system 1.

A system configuration of a license management system 1, which is a preferred embodiment of the present invention, is described based on with reference to FIG. 2. FIG. 2 is a diagram showing a system configuration of a license management system 1 according to a preferred embodiment of the present invention. The license management system 1 includes a computer 10, a provider terminal 100, a user terminal 200, and a public network (Internet network, third or fourth generation communication network, or the like) 5, and is a computer system for managing a license of an application. It is.

In addition, the number of devices constituting the license management system 1 and the types thereof can be changed as appropriate. Further, the license management system 1 may be realized not only by existing devices but also by virtual devices. Furthermore, each process to be described below may be realized by any one or of the devices constituting the license management system 1, or a combination of two or more of them.

The computer 10 is the above-described computer device having functions to be described below.

The provider terminal 100 is the above-described terminal device having functions to be described below.

The user terminal 200 is the above-described terminal device having functions to be described below.

Description of Each Function

Figure 3:
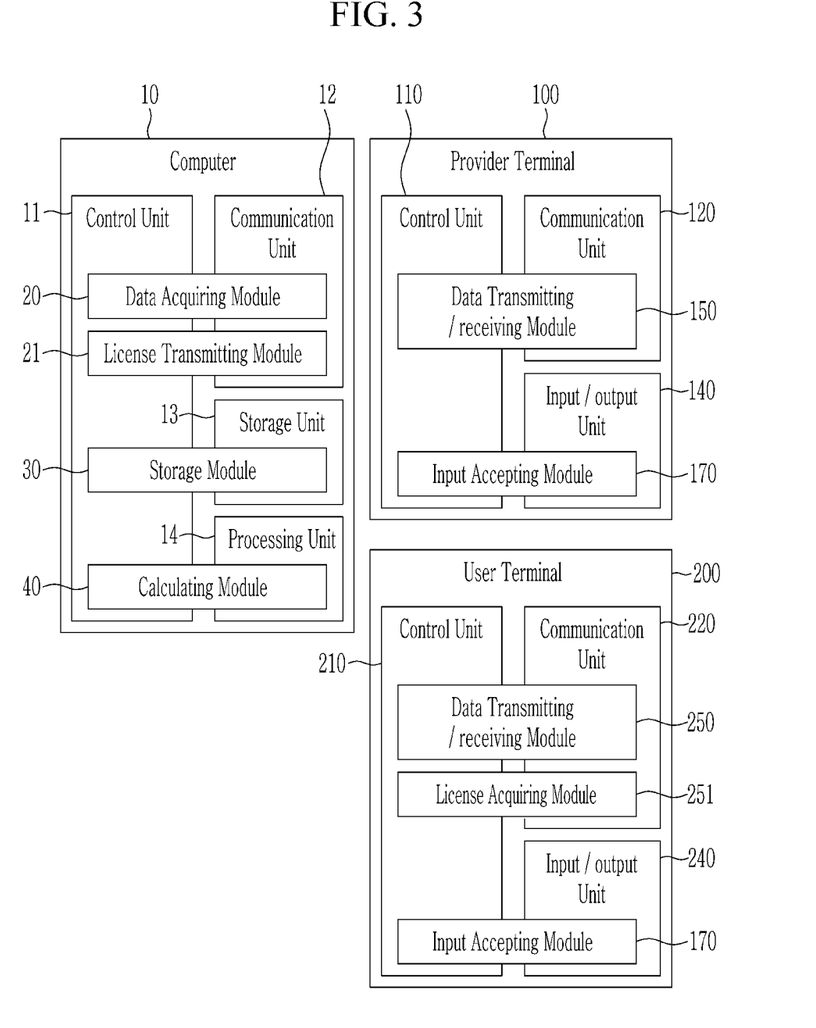
FIG. 3 is a functional block diagram of a computer 10, a provider terminal 100, and a user terminal 200.

Functions of a license management system 1 according to the preferred embodiment of the present invention are described with reference to FIG. 3. FIG. 3 is a functional block diagram of a computer 10, a provider terminal 100, and a user terminal 200.

The computer 10 includes, as a control unit 11, a CPU (Central Processing Unit), a RAM (Random Access Memory), a ROM (Read Only Memory), and the like, and includes, as a communication unit 12, a device for enabling communication with other devices, for example, WiFi (Wireless Fidelity) compliant device conforming to IEEE 802.11. Further, the server 10 includes, as a storage unit 13, a data storage unit, such as a hard disk, a semiconductor memory, a recording medium, a memory card, or the like. Furthermore, the computer 10 includes, as a processing unit 14, various devices that execute various calculations, processing, and the like.

In the computer 10, the control unit 11 reads a predetermined program thereby implementing a data acquiring module 20 and a license transmitting module 21 in cooperation with the communication unit 12. Further, in the computer 10, the control unit 11 reads a predetermined program thereby implementing a storage module 30 in cooperation with the storage unit 13. Furthermore, in the computer 10, the control unit 11 reads a predetermined program thereby implement a calculating module 40 in cooperation with the processing unit 14.

Like the computer 10, the provider terminal 100 includes, as a control unit 110, a CPU, a RAM, a ROM, and the like, and includes, as a communication unit 120, a WiFi compliant device or the like for enabling communication with other devices. Further, the provider terminal 100 includes, as an input/output unit 140, various devices such as a display unit for outputting and displaying data and images controlled by the control unit 110, and an input unit such as a touch panel, a keyboard, or a mouse for accepting an input from a user.

In the provider terminal 100, the control unit 110 reads a predetermined program thereby implementing a data transmitting/receiving module 150 in cooperation with the communication unit 120. Further, in the provider terminal 100, the control unit 110 reads a predetermined program thereby implementing an input accepting module 170 in cooperation with the input/output unit 140.

Like the provider terminal 100, the user terminal 200 includes, as a control unit 210, a CPU, a RAM, a ROM, and the like, and includes, as a communication unit 220, a device for enabling communication with other devices. Further, the user terminal 200 includes, as an input/output unit 240, various devices such as a display unit and an input unit.

In the user terminal 200, the control unit 210 reads a predetermined program thereby implementing a data transmitting/receiving module 250 and a license acquiring module 251 in cooperation with the communication unit 220. Further, in the provider terminal 100, the control unit 210 reads a predetermined program thereby implementing an input accepting module 270 in cooperation with the input/output unit 240.

License Registration Process

Figure 4:
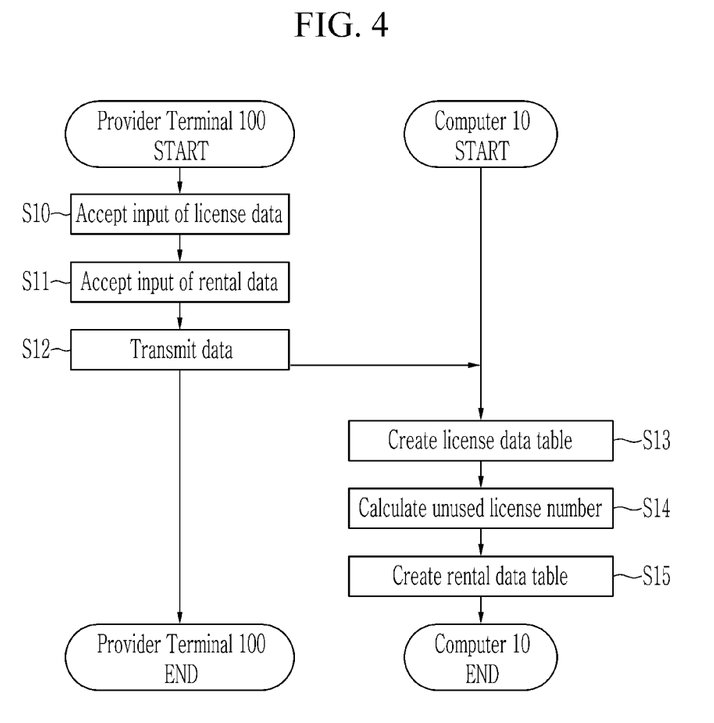
FIG. 4 is a flowchart showing a license registration process performed by a computer 10 and a provider terminal 100.

A license registration process executed by a license management system 1 is described with reference to FIG. 4. FIG. 4 is a flowchart of a license registration process performed by a computer 10 and a provider terminal 100. The processing executed by modules of each device described above is described together with this processing.

First, an input accepting module 170 accepts an input of license data indicating an application name, owned licenses, an owned license number which is the number of owned licenses, a used license number which is the number of used licenses, and a unused license number which is the number of unused licenses, and a rentable license number which is the number of rentable licenses (step S10). In step S10, the input accepting module 170 may directly accept the input of the license data from the administrator, may acquire the license data stored in the computer 10 itself or another computer, or may acquire the number of rentable licenses from the number of unused licenses based on a preset ratio. The input accepting module 170 accepts the input of the license data corresponding to one application. The used license is a license that is currently in use. An unused license is a license that is not currently used and can be provided. The rentable license is a license to be actually rented to the user terminal 200.

The provider terminal 100 executes the process described above for all the applications for which licenses have been provided.

The input accepting module 170 may accept the number of unused licenses or the number of rentable licenses as the license data.

The input accepting module 170 accepts an input of rental data indicating an application name, rentable licenses, rental periods of the rentable licenses, and the number of rentable licenses in each rental period (step S11). In step S11, the input accepting module 170 accepts, as the rental period, for example, an input of a predetermined period such as the start date and end date, the number of years, the number of months, the number of days, each month, each day, or each year. The input accepting module 170 accepts, as the number of rentable licenses, the input of the number of licenses that can be provided in each predetermined period.

For example, the input accepting module 170 accepts the input indicating that there are 30 unused licenses, 29 unused licenses can be provided in January, 27 unused licenses can be provided in February, 25 unused licenses can be provided in March, and 5 unused licenses can be provided in April since it is expected that the number of employees will increase due to midterm recruitment or new recruitment. Further, the input accepting module 170 accepts the input indicating that there are 15 unused licenses and 15 licenses can be provided from January to March since there are no plans to use the licenses from January to March, and accepts the input indicating that no license is provided in April since there is a plan to use all unused licenses (that is, accepts the input indicating that the number of rentable licenses is zero).

The data transmitting/receiving module 150 transmits the license data and the rental data to the computer 10 (step S12).

The data acquiring module 20 acquires the license data and the rental data. By doing this, the computer 10 acquires the licenses owned by the company to which the provider terminal 100 belongs and the number of the licenses. In addition, the computer 10 acquires a providable period set by the provider, licenses which can be provided in this period, and the number of licenses which can be provided in this period.

In the following description, it is assumed that the computer 10 acquires the license data and the rental data from a plurality of provider terminals 100.

The storage module 30 stores the license data and creates a license data table (step S13).

License Data Table

Figure 6:
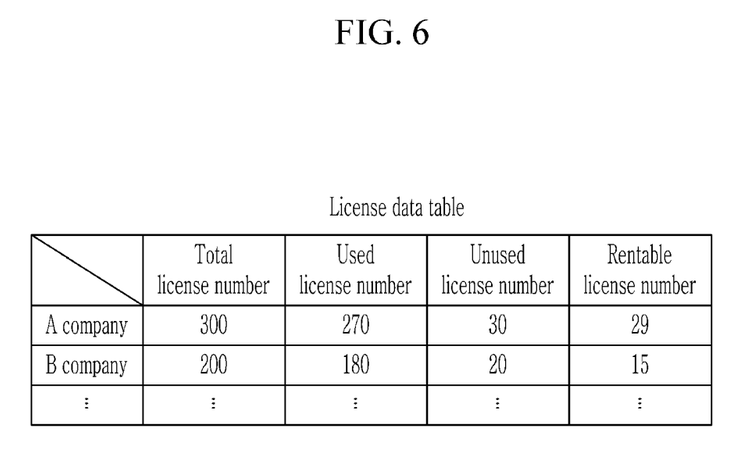
FIG. 6 shows an example of a license data table.

A license data table stored in a computer 10 is described with reference to FIG. 6. FIG. 6 is a diagram showing a license data table stored by a storage module 30. In FIG. 6, a storage module 30 associates the total number of licenses, the number of used licenses, the number of unused licenses, and the number of rentable licenses based on acquired license data, and creates and stores a license data table. The license data table stores each item described above for each providing source. That is, the storage module 30 creates and stores, as the license data table, the total number of licenses, the number of used licenses, the number of unused licenses and the number of rentable licenses for "Company A", the total number of licenses, the number of used licenses, the number of unused licenses and the number of rentable licenses for "B company", and the total number of licenses, the number of used licenses, the number of unused licenses and the number of rentable licenses for each company not shown.

A calculating module 40 calculates the number of unused licenses based on the license data stored in the license data table (step S14). In step S14, the calculating module 40 calculates the number of unused licenses by referring to the license data table to acquire the number of unused licenses.

The storage module 30 stores rental data and creates a rental data table (step S15). In step S15, the storage module 30 creates the rental data table in which one or more license providing sources are combined into one table.

The storage module 30 may create one table for each providing source. In this case, one table is created for one providing source.

Rental Data Table

Figure 7:
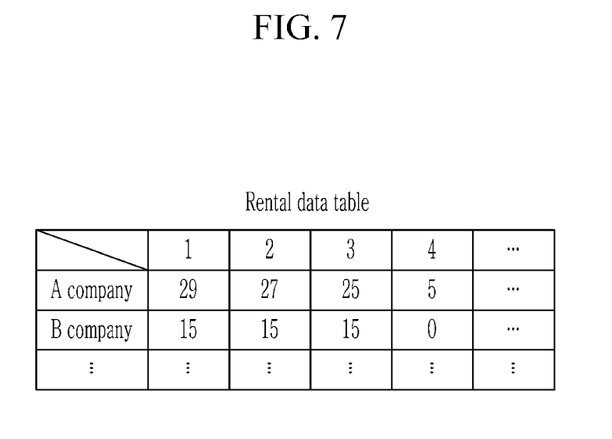
FIG. 7 shows an example of a rental data table.

A rental data table stored in a computer 10 is described with reference to FIG. 7. FIG. 7 is a diagram showing a rental data table stored by a storage module 30. In FIG. 7, a storage module 30 associates a providing period and the number of rentable licenses that can be provided in each providing period based on the acquired rental data, and creates and stores a rental data table. The rental data table stores each item described above for each company. That is, the storage module 30 stores the number of rentable licenses in January, the number of rentable licenses in February, the number of rentable licenses in March, the number of rentable licenses in April, and the number of rentable licenses in each month not shown, for each providing source.

The storage module 30 stores the number of rentable licenses in each rental period of each application based on the license data table and the rental data table, and creates a rentable license number table. The storage module 30 creates the rentable license number table in which one or more applications are combined into one table. The storage module 30 stores, as the number of rentable licenses, a sum of the rentable license numbers stored as the license data table and the rental data table described above. For example, since the number of rentable licenses for "company A" is 29 and the number of rentable licenses for "company B" is 15 in January, the storage module 30 stores the sum (44) of 29 and 15 as the number of rentable licenses in January. Similarly, the storage module 30 stores, as the number of rentable licenses in February March or April, the sum (42, 40 or 5) of the rentable license numbers of the respective providing sources.

The number of providing sources is not limited to two, and may be more or less than two. The period is not limited to each month and can be changed as appropriate.

Rentable License Number Table

Figure 8:
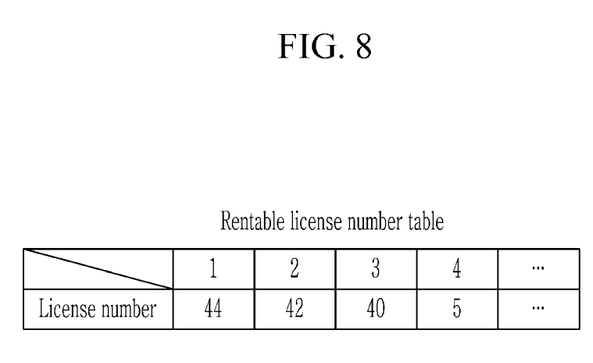
FIG. 8 is a diagram showing an example of a rentable license number table.

A rentable license number table stored in a computer 10 is described with reference to FIG. 8. FIG. 8 is a diagram showing a rentable license number table stored by a storage module 30. In FIG. 8, a storage module 30 associates a providing period and the number of rentable licenses that can be provided in the providing period based on the license data table and the rental data table described above, and creates and stores a rentable license number table. The storage module 30 stores, as the number of rentable licenses, a sum of the license numbers of the respective providing sources for each providing period. That is, the storage module 30 stores, as the number of rentable licenses in January, 44 which is the sum of 29 for "A company" and 15 for "B company". Similarly, the storage module 30 stores, as the number of rentable licenses in February, March or April, 42, 40 or 5 which is the sum of the rentable license numbers.

The period is not limited to each month, and can be changed as appropriate.

The above is the license registration process.

License Providing Process

Figure 5:
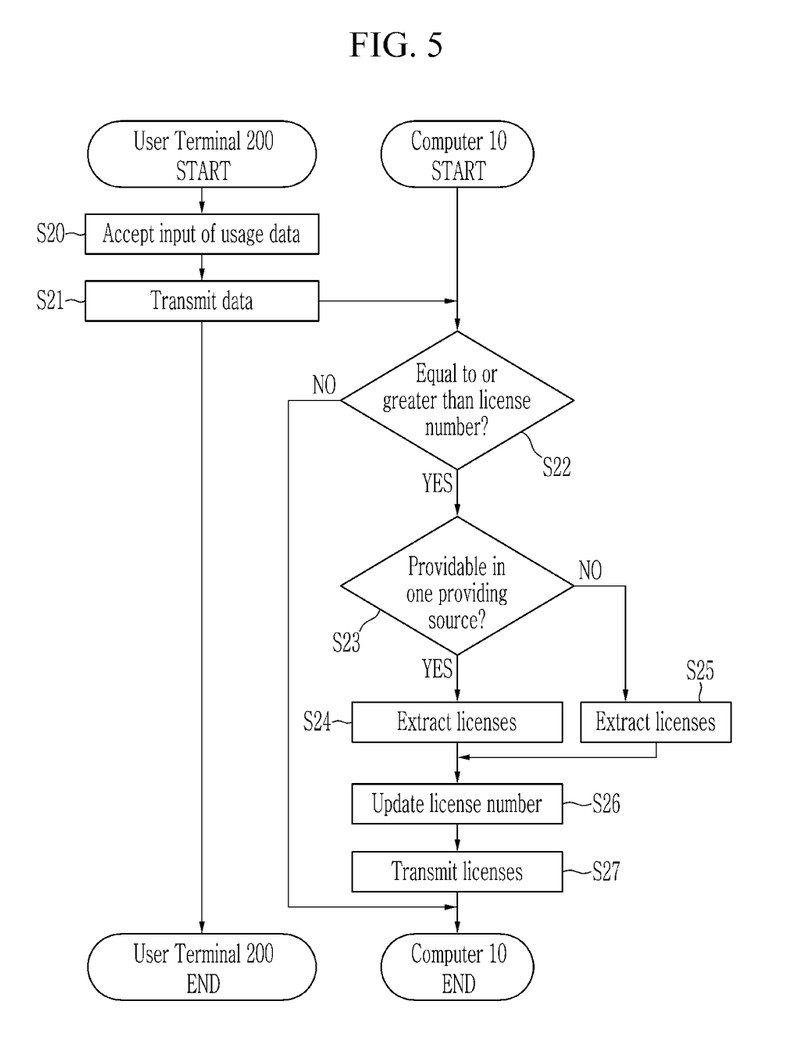
FIG. 5 is a flowchart showing a license providing process executed by a computer 10 and a user terminal 200.

A license providing process executed by a license management system 1 is described with reference to FIG. 5. FIG. 5 is a flowchart of a license registration process performed by a computer 10 and a user terminal 200. The processing executed by the modules of each device described above is described together with this process.

First, an input accepting module 270 accepts an input of usage data indicating an application name, the number of required licenses, and a usage period (step S20). In step S20, the input accepting module 270 accepts an input of the number of required licenses and the usage period thereof from an administrator.

A data transmitting/receiving module 250 transmits the received usage data to the computer 10 (step S21).

A data acquiring module 20 acquires the usage data. A calculating module 40 determines the number of rentable licenses among unused licenses based on the usage data, a license data table, a rental data table, and a rentable license number table. The calculating module 40 may determine, for example, the number of licenses stored in the rentable license number table as the number of rentable licenses. Further, the data acquiring module 20 acquires information on the number of rentable licenses set in advance by an administrator of a provider terminal 100, and the calculating module 40 may determine the number of rentable licenses based on the acquired information and the above-described tables. Furthermore, the calculating module 40 may determine the number of rentable licenses from the number of unused licenses based on a preset ratio. In a process to be described below, it is assumed that the number of rentable licenses is determined based on the number of licenses stored in the rentable license number table.

The calculating module 40 determines whether the number of rentable licenses is equal to or greater than the number of licenses included in the usage data, based on the acquired usage data and the rentable license number table (step S22). In step S22, the calculating module 40 determines whether the number of licenses in a providing period stored in the rentable license number table is equal to or greater than the number of licenses in a usage period included in the usage data. At this time, the calculating module 40 determines whether the minimum number of licenses in the corresponding providing period is equal to or greater than the number of licenses included in the usage data. For example, if the usage period is from January to April, since the number of rentable licenses is five, the calculating module 40 determines whether the number of licenses included in the usage data acquired this time is four or less. Further, for example, if the usage period is January, since the number of rentable licenses is 44, the calculating module 40 determines whether the number of licenses included in the usage data acquired this time is 43 or less. Thus, the calculating module 40 determines whether the minimum number of licenses among the numbers of licenses associated with the usage period is equal to or greater than the number of licenses included in the usage data.

By doing this, for the provider, it is possible to prevent the license from being insufficient when they are used, and for the user, there is no risk of the license expiring during the usage period, so that the convenience is improved.

In step S22, when the number of rentable licenses is less than the number of licenses included in the usage data (NO in step S22), the calculating module 40 determines that the license cannot be rented, and ends the process. At this time, the computer 10 may create a notification that the license cannot be rented, and may transmit the notification to the user terminal 200. For example, the computer 10 creates, as the notification, the content regarding the number of rentable licenses in the acquired rental period or the rental period in which the acquired number of licenses can be rented. Further, the notification may include various information necessary for using a part or the whole of the application, such as a method of purchasing the license or a method of obtaining a trial version. Based on the notification, the user terminal 200 may receive an input such as re-input of the rental period or re-input of the number of licenses.

On the other hand, in step S22, if the number of rentable licenses is equal to or greater than the number of licenses included in the usage data (YES in step S22), the calculating module 40 determines that the license can be rented, and determines whether the number of licenses included in the usage data is equal to or less than the number of licenses that can be provided from one providing source, based on the rental data table (step S23). In step S23, the calculating module 40 determines whether the number of rentable license of each providing source in the corresponding rental period stored in the rental data table is equal to or greater than the number of licenses included in the usage data acquired this time. For example, if the usage period is from January to March, since the number of rentable licenses in the company A is 25 and the number of rentable licenses in the company B is 15, the calculating module 40 determines whether the number of licenses included in the usage data acquired this time is equal to or less than 25 or is equal to or less than 15, for the number of rentable licenses in each providing source.

In step S23, when the calculating module 40 determines that it is equal to or less than the number of licenses that can be provided in one providing source (YES in step S23), the storage module 30 extracts the licenses acquired from the one providing source. (Step S24). In step S24, for example, if the rental period included in the usage data is from January to March and the number of licenses is 24, the storage module 30 extracts the number of licenses in the company A, which can provide the closest number of licenses, among the providing sources satisfying the conditions, by referring to the rental data table. Further, for example, if the rental period included in the usage data is from January to March and the number of licenses is 15, the storage module 30 extracts the number of licenses in the company B, which can provide the closest number of licenses, among the providing sources that can providing the number of licenses satisfying the conditions, by referring to the rental data table.

On the other hand, when the calculating module 40 determines in step S23 that it is greater than the number of licenses that can be provided by one providing source (NO in step S23), the storage module 30 extracts the licenses acquired from a plurality of providing sources (step S25). In step S25, for example, if the rental period included in the usage data is from January to March and the number of licenses is 30, the storage module 30 extracts 25 licenses of the company A and 5 licenses of the company B by referring to the rental data table, in order to extract the licenses from as few providing sources as possible among the providing sources satisfying the conditions.

In step S25, the storage module 30 may extract 15 licenses of the company B and 15 licenses of the company A. That is, when extracting the licenses from the plurality of providing sources, the licenses of the providing source whose the number of providable licenses is small may be preferentially extracted.

The processing in step S24 and the processing in step S25 are processing for extracting the licenses from as few providing source as possible. By doing this, it is possible to select the optimum providing source according to the number of licenses that can be provided by each providing source.

The storage module 30 updates the number of licenses in the license data table, the rental data table, and the rentable license number table based on the extracted licenses (step S26). In step S26, the storage module 30 subtracts the number of extracted licenses from one originally stored in each table and newly stores the result of subtraction.

A license transmitting module 21 transmits the extracted licenses to the user terminal 200 (step S27). The computer 10 can provide the user terminal 200 with the licenses by the processing in step S27.

A license acquiring module 251 acquires the licenses provided by the computer 10. The administrator of the user terminal 200 executes various processes necessary for using the applications based on the acquired licenses.

The above is the license providing process.

The above-described means and functions are realized by reading and executing a predetermined program by a computer (including a CPU, an information processing device, or various terminals). The program is provided, for example, in a form (SaaS: software as a service) provided from the computer via a network. Further, the program is provided, for example, in a form recorded in a computer-readable recording medium such as a flexible disk, a CD (e.g., CD-ROM or the like), a DVD (DVD-ROM, DVD-RAM, or the like), a compact memory, or the like. In this case, the computer reads the program from the recording medium and transfers the program to an internal storage unit or an external storage unit to be stored and executed. Furthermore, the program may be recorded in advance in a storage device (recording medium) such as a magnetic disk, an optical disk, an optical magnetic disk, or the like, and be provided from the recording medium to the computer through a communication line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: license management system, 10: computer, 100: provider terminal, 200: user terminal

What is claimed is:

1. A computer system that manages licenses of an application, comprising:
    a communication device; and
    one or more processors that:
        acquire a number of owned licenses from each of a plurality of providing sources via the communication device;
        calculate a number of unused licenses which are not currently used among the acquired number of licenses;
        determine a number of rentable licenses from the calculated number of unused licenses;
        acquire a number of required licenses via the communication device;
        determine whether the number of required licenses satisfies the number of rentable licenses in one providing source;
        extract rentable licenses from fewest providing sources among the plurality of providing sources when the number of required licenses does not satisfy the number of rentable licenses in one providing source; and
        provide the extracted rentable licenses.

2. The computer system according to claim 1, further comprising a storage device that stores the number of rentable licenses and a rental period of the rentable licenses in association with each other,
    wherein the one or more processors provide the rentable licenses during the rental period.

3. The computer system according to claim 2, wherein the one or more processors provide a minimum number of licenses among numbers of rentable licenses in the rental period.

4. The computer system according to claim 1, wherein the one or more processors determine the fewest providing sources among the plurality of providing sources when the number of required licenses does not satisfy the number of rentable licenses in one providing source, a total number of rentable licenses in the fewest providing sources being greater than or equal to the number of required licenses.

5. A license management method of managing licenses of an application, the method comprising:
    acquiring a number of owned licenses from each of a plurality of providing sources;
    calculating a number of unused licenses which are not currently used among the acquired number of licenses;
    determining a number of rentable licenses from the calculated number of unused licenses;
    acquiring a number of required licenses;

determining whether the number of required licenses satisfies the number of rentable licenses in one providing source;

extracting rentable licenses from fewest providing sources among the plurality of providing sources when the number of required licenses does not satisfy the number of rentable licenses in one providing source; and providing the extracted rentable licenses.

6. The method according to claim 5, wherein extracting the rentable licenses includes determining the fewest providing sources among the plurality of providing sources when the number of required licenses does not satisfy the number of rentable licenses in one providing source, a total number of rentable licenses in the fewest providing sources being greater than or equal to the number of required licenses.

7. A non-transitory computer-readable medium that stores a program for causing a computer system that manages licenses of an application to execute:

acquiring a number of owned licenses from each of a plurality of providing sources;

calculating a number of unused licenses which are not currently used among the acquired number of licenses;

determining a number of rentable licenses from the calculated number of unused licenses;

acquiring a number of required licenses;

determining whether the number of required licenses satisfies the number of rentable licenses in one providing source;

extracting rentable licenses from fewest providing sources among the plurality of providing sources when the number of required licenses does not satisfy the number of rentable licenses in one providing source; and providing the extracted rentable licenses.

8. The non-transitory computer-readable medium according to claim 7, wherein extracting the rentable licenses includes determining the fewest providing sources among the plurality of providing sources when the number of required licenses does not satisfy the number of rentable licenses in one providing source, a total number of rentable licenses in the fewest providing sources being greater than or equal to the number of required licenses.

* * * * *